United States Patent
Park et al.

(10) Patent No.: US 10,027,426 B2
(45) Date of Patent: Jul. 17, 2018

(54) PHOTON GENERATING APPARATUS

(71) Applicant: Korea Research Institute of Standards and Science, Daejeon (KR)

(72) Inventors: Hee Su Park, Daejeon (KR); Eun Joo Lee, Daejeon (KR); Hee Jung Lee, Daejeon (KR); Sang Min Lee, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 15/711,174

(22) Filed: Sep. 21, 2017

(65) Prior Publication Data

US 2018/0145768 A1    May 24, 2018

(30) Foreign Application Priority Data

Nov. 18, 2016  (KR) .......................... 10-2016-0154216

(51) Int. Cl.
| | |
|---|---|
| *H04B 10/70* | (2013.01) |
| *H04B 10/291* | (2013.01) |
| *H04J 14/02* | (2006.01) |
| *H04B 10/50* | (2013.01) |
| *H04B 10/2507* | (2013.01) |
| *H04B 10/61* | (2013.01) |

(52) U.S. Cl.
CPC ......... *H04B 10/70* (2013.01); *H04B 10/2507* (2013.01); *H04B 10/2912* (2013.01); *H04B 10/503* (2013.01); *H04B 10/6161* (2013.01); *H04J 14/02* (2013.01)

(58) Field of Classification Search
None
See application file for complete search history.

(56) References Cited

U.S. PATENT DOCUMENTS

| | | | | |
|---|---|---|---|---|
| 2004/0109633 A1* | 6/2004 | Pittman | ................ | B82Y 10/00 385/16 |
| 2010/0226659 A1* | 9/2010 | Nishioka | ............... | H04B 10/70 398/154 |
| 2014/0153926 A1* | 6/2014 | Mower | ................ | H04B 10/70 398/101 |

FOREIGN PATENT DOCUMENTS

| | | |
|---|---|---|
| JP | 2007-094087 A | 4/2007 |
| KR | 1020040025157 A | 3/2004 |
| KR | 101478107 B1 | 2/2015 |
| KR | 101573867 B1 | 7/2015 |

* cited by examiner

*Primary Examiner* — Mike Stahl
(74) *Attorney, Agent, or Firm* — Hammer & Associates, P.C.

(57) ABSTRACT

According to one embodiment of the present invention, there is provided a photon generating apparatus including: a light source configured to emit light; an optical medium configured to generate a pair of photons from the light; a detector configured to detect one photon from the pair of photons and output a detection time of the photon; a buffer including an optical line and an optical switch disposed on an optical path of the photon, which is one photon except for the photon detected by the detector, of the pair of photons; and a processor configured to output a driving signal which controls the optical switch so that a delay occurs at the optical path using the detection time of the photon detected by the detector.

8 Claims, 4 Drawing Sheets

PHOTON GENERATING APPARATUS

CROSS-REFERENCE TO RELATED APPLICATION

This application claims priority to and the benefit of Korean Patent Application No. 10-2016-0154216, filed on Nov. 18, 2016, the disclosure of which is incorporated herein by reference in its entirety.

BACKGROUND

1. Field of the Invention

The present invention relates to a photon generating apparatus, and more particularly, to a photon generating apparatus using an optical switch.

2. Discussion of Related Art

Existing optical communication technologies based on a plurality of photons are always accompanied with security problems, and software security technologies based on complex algorithms are used for overcoming the problems. However, the software technologies have factors which threaten security factors, such as reliability problems and the like, occurring by hardware providers in the development of hardware, and accordingly, quantum communication technologies capable of essentially solving security problems on the basis of physical laws are being developed.

Although a single-photon light source, which is a core factor for quantum communication, can eliminate the possibility of an eavesdropper eavesdropping some signals in the middle of a communication network if there is an ideal single-photon light source configured to generate only one single-photon at a required time, there are practically no ideal single-photon light sources.

Single-photon light sources based on weak laser pulses or nonlinear optics are used in existing quantum communication, and generally have photon generating an efficiency of 10% or less, but when the photon generation efficiency is increased higher than 10%, the frequency of a case in which two or more photons are simultaneously emitted is increased, and thus security is seriously hindered. In addition, although single-photon light sources based on so-called single emitters using quantum dots or single-atom are also being developed, there is a common limit in that single-photon generation efficiency cannot be obtained sufficiently due to a limit of photon collecting efficiency.

SUMMARY OF THE INVENTION

The present invention is directed to a photon generating apparatus.

In addition, the present invention is directed to a photon generating apparatus which has a high probability of generating one photon at a required time.

In addition, the present invention is directed to a photon generating apparatus in which quantum mechanical purity of a photon is improved by dispersion compensation.

In addition, the present invention is directed to a photon generating apparatus having high possibilities of practical use.

According to one aspect of the present invention, there is provided a photon generating apparatus including: a light source configured to emit light; an optical medium configured to generate a pair of photons from the light; a detector configured to detect one photon from the pair of photons and output a detection time of the photon; a buffer including an optical line and an optical switch disposed on an optical path of the photon, which is one photon except for the photon detected by the detector, of the pair of photons; and a processor configured to output a driving signal which controls the optical switch so that a delay occurs at the optical path using the detection time of the photon detected by the detector.

The optical switch may include a plurality of inputs and a plurality of outputs which are internally connected to the plurality of inputs.

The optical line may include a first optical delay line disposed between at least one among the plurality of inputs and at least one among the plurality of outputs.

The light may be emitted at a predetermined period, and the first optical delay line may be formed such that the photon, which is one photon except for the photon detected by the detector, of the pair of photons is delayed for an integral multiple of the period.

The first optical delay line may include a plurality of optical fibers.

The plurality of optical fibers may have different lengths or chromatic dispersions.

A chromatic dispersion of the first optical delay line may be removed.

A plurality of optical switches each identical to the optical switch may be included, and the optical line may include a second optical delay line disposed between the plurality of optical switches.

A plurality of second optical delay lines each identical to the second optical delay line may be included, and the plurality of second optical delay lines may have different lengths or chromatic dispersions.

A chromatic dispersion of the second optical delay line may be removed.

The driving signal may form an optical path configured to compensate for a value difference between the detection time of the photon detected by the detector and a preset time so that the photon, which is one photon except for the photon detected by the detector, of the pair of photons is output at the preset time.

The optical medium may perform one of spontaneous parametric down conversion and spontaneous four wave mixing.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
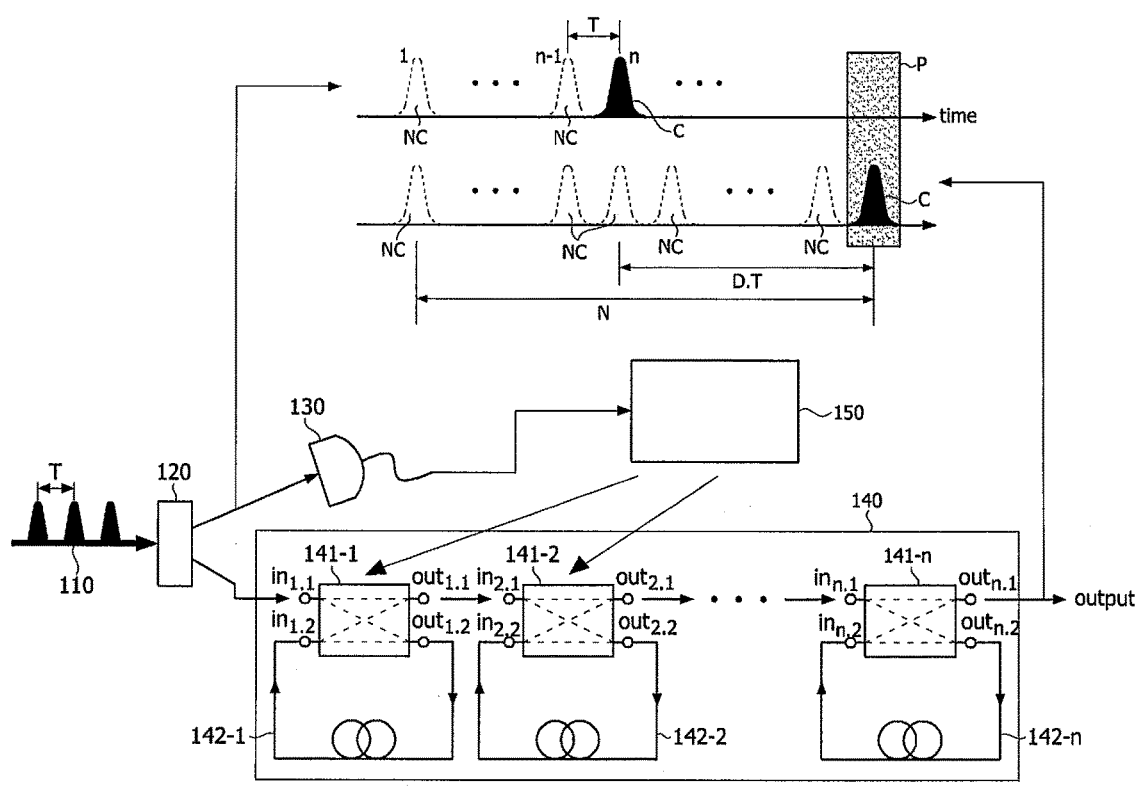
FIG. 1 is a block diagram illustrating a photon generating apparatus according to a first embodiment of the present invention.

While the invention may be modified in various ways and take on various alternative forms, specific embodiments thereof are shown in the drawings and described in detail below as examples. However, it should be understood that there is no intent to limit the invention to the particular forms disclosed and that the invention covers all modifications, equivalents, and alternatives falling within the spirit and scope of the appended claims.

Although terms including ordinal terms such as "first," "second," etc. may be used herein in reference to elements of the invention, such elements are not to be construed as limited by these terms. These terms are only used to distinguish one element from another element. For example, a first element could be termed as a second element and a second element could be termed as a first element without departing from the scope of the present invention. Herein, the term "and/or" includes any and all combinations of one or more referents.

It should be understood that when an element is referred to as being "connected" or "coupled" to another element, the element may be directly connected or coupled to another element, or intervening elements may be present therebetween. In contrast, when an element is referred to as being "directly connected" or "directly coupled" to another element, there are no intervening elements.

The terminology used herein to describe the embodiments of the invention is not intended to limit the scope of the invention. The articles "a," "an," and "the" are singular in that they have a single referent, however the use of the singular form in the present document does not preclude the presence of a plural referent. In other words, elements of the invention referred to in the singular may number one or more unless the context clearly indicates otherwise. It should be further understood that the terms "comprise," "comprising," "include," and/or "including" used herein, specify the presence of stated features, numbers, steps, operations, elements, and/or components, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, the embodiments of the invention will be described in detail with reference to the accompanying drawings, and the same or corresponding elements will be consistently denoted by the same reference numerals and will not be repeatedly described regardless of the reference numerals.

Figure 2:
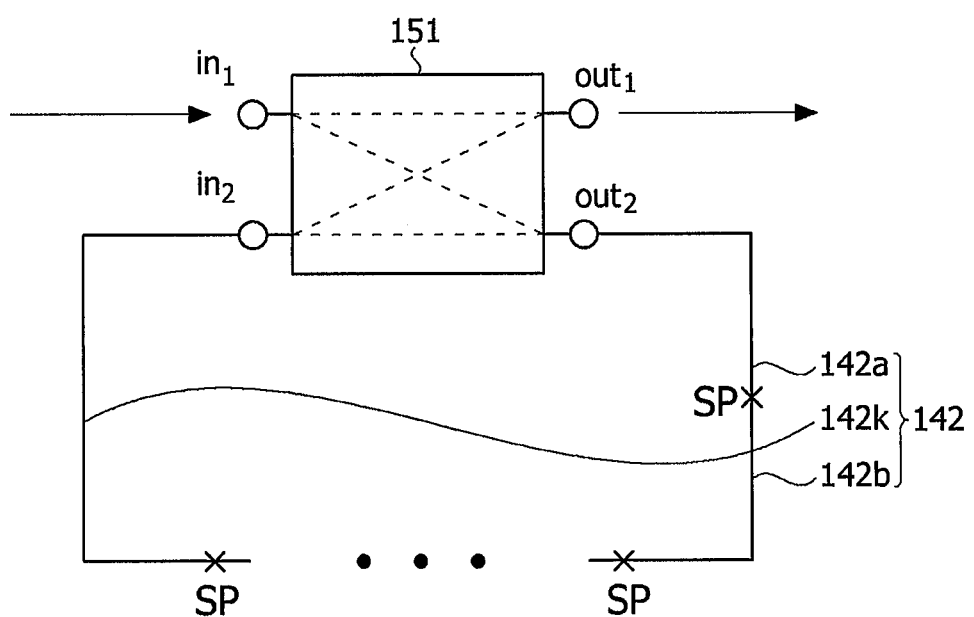
FIG. 2 is a view illustrating a buffer of the photon generating apparatus according to the first embodiment of the present invention.

FIG. 1 is a block diagram illustrating a photon generating apparatus according to a first embodiment of the present invention, and FIG. 2 is a view illustrating a buffer of the photon generating apparatus according to the first embodiment of the present invention.

Referring to FIGS. 1 and 2, the photon generating apparatus according to the first embodiment may include a light source 110 configured to emit light, an optical medium 120 configured to generate a pair of photons from the light, a detector 130 configured to detect one photon of the pair of photons, a buffer 140 including optical switches 141 disposed on an optical path of the other photon, which is one photon except for the photon detected by the detector 130, of the pair of photons, and a processor 150 configured to output driving signals which control switching of the optical switches 141 using a time at which the photon is detected by the detector 130.

The light source 110 may emit light. The light may have a predetermined period T. The light source 110 may be a pulse type laser but is not limited thereto. For example, the light source 110 may emit light having a pulse train having a constant period T. The light may form one output photon having N periodic pulses.

The constant period of the light may be the same as a time during which light is transmitted a minimum variable distance in the buffer 140. That is, the minimum variable distance in the buffer 140 may be greater than at least constant period T of the light. In addition, the minimum variable distance in the buffer 140 may be an integral multiple of the constant period of the light.

The optical medium 120 may generate the pair of photons from light emitted by the light source 110. One of the pair of photons may have a wavelength in a visible or near-infrared range. The other photon of the pair of photons may have a wavelength in the telecom band. However, the embodiment is not limited thereto.

For example, a wavelength band may be in the range of 1250 to 1650 nm. Accordingly, light loss may be low while light is transmitted through an optical fiber or the atmosphere.

The optical medium 120 may emit photon pairs having predetermined wavelengths by phase matching the photons and the light emitted by the light source 110.

For example, a pulse C having a generated photon among a plurality of pulses of light provided toward the detector 130 through the optical medium 120 may be an $n^{th}$ pulse. The pulses except for the $n^{th}$ pulse may be pulses NC which have no photon.

The optical medium 120 may simultaneously generate two photons based on spontaneous parametric down conversion (SPDC) and/or spontaneous four wave mixing (SFWM). Wavelengths and directions of two photons can be determined by the law of momentum conservation and the law of energy conservation.

Since efficiency of generating a pair of photons is very low unlike conventional classical optical phenomena, the pair of photons are generally generated intermittently and the time of generating the pair of photons may be random rather than deterministic.

However, although a pair of photons are basically randomly generated, deterministic photons, which mean that photons are output at a set time, may be generated when a fact that detection of one photon heralds the existence of the other twin photon is used.

The detector 130 may be installed on a path through which one photon of the pair of photons is transmitted. The detector 130 may detect the one photon. At this time, the other photon of the pair of photons may be transmitted to the buffer 140.

The detector 130 may output a detection time of one photon. The detector 130 may provide the detection time to the processor 150. The detector 130 may include a heralding photon counter but is not limited thereto.

The buffer 140 may include the optical switches 141 disposed on the optical path of the other photon, which is one photon except for the photon detected by detector 130, of the pair of photons and optical lines.

The optical switches 141 may include a plurality of inputs in and a plurality of outputs out.

The optical switches 141 may include the plurality of inputs in and the plurality of outputs out and may internally connect the inputs in and the outputs out. One of the plurality of outputs $out_{n.1}$ and $out_{n.2}$ of an $n^{th}$ optical switch 141-$n$ disposed at a last stage may be connected to the output through which the photon is output.

The optical switches 141 may dynamically change connections between the inputs in and the outputs out according to driving signals received from the processor 150.

Each of the optical switches 141 may include a polarizing beam splitter and an electro-optic polarization modulator. In addition, the optical switch 141 may include an integrated-optic 1×N or N×N (N>1) interferometer. However, the embodiment is not limited thereto, and the embodiment may include other various switching devices other than that.

Referring to FIG. 2, the optical switches 141 may control connections between two inputs $in_1$ and $in_2$ and two outputs $out_1$ and $out_2$. The optical switch 141 may include the input 1 $in_1$ and the input 2 $in_2$ as two inputs. In addition, the optical switch 141 may include the output 1 $out_1$ and the output 2 $out_2$ as two outputs.

Two inputs $in_1$ and $in_2$ may be respectively connected to two outputs $out_1$ and $out_2$. As a first example, the input 1 $in_1$ may be connected to the output 1 $out_1$, and the input 2 $in_2$ may be connected to the output 2 $out_2$. In addition, as a second example, the input 1 $in_1$ may be connected to the output 2 $out_2$, and the input 2 $in_2$ may be connected to the output 1 $out_1$.

In the second example, a photon may be transmitted to the next optical switch 141 or the next output after passing through a longer optical path when compared to the first example. Accordingly, a delay of the photon of the second example may be longer than that of the first example. Since the connections of the optical switches 141 are controlled as describe above, a length of an optical path through which a photon passes until the photon is output through the output can be adjusted. An optical delay time may be an integral multiple of the period T of the light source 110 as described above.

A plurality of optical switches 141-1, 141-2, . . . , and 141-$n$ may respectively include a plurality of first optical delay lines 142-1, 142-2, . . . , and 142-$n$. Connections between inputs and outputs of the switches may be controlled according to driving signals received from the processor 150. Accordingly, the optical paths may be adjusted, and the optical delay time may also be adjusted. In addition, the pulse C having the generated photon may be generated at a predetermined required time P using the buffer 140. Accordingly, the photon generating apparatus of the embodiment may have a high probability of generating a photon at a required time.

Each of the optical lines may include a first optical delay line 142 and a second optical delay line 143.

An optical delay time may be changed depending on a length of the optical line. The first optical delay line 142 may be disposed between at least one of the plurality of inputs and at least one of the plurality of outputs. A plurality of first optical delay lines 142 may be connected in one optical switch 141. The first optical delay line 142 may include a plurality of optical fibers 142$a$ to 142$k$.

For example, the first optical delay line 142 which connects one output and one input of the optical switch 141 may include the plurality of optical fibers 142$a$ to 142$k$. The plurality of optical fibers 142$a$ to 142$k$ may be spliced to form the first optical delay line 142. The first optical delay line 142 may include a plurality of splicing points SP.

The plurality of optical fibers 142$a$ to 142$k$ may be a standard telecom fiber, a dispersion-compensating fiber (DCF), or a dispersion-shifted fiber (DSF). However, the embodiment is not limited thereto.

The plurality of optical fibers 142$a$ and 142$b$ to 142$k$ may have different lengths or chromatic dispersions. For example, each of the plurality of optical fibers may have a different chromatic dispersion and length.

The plurality of optical fibers 142$a$ and 142$b$ to 142$k$ may be spliced to remove a chromatic dispersion of the first optical delay line 142. Accordingly, a pulse-shaped photon may maintain the same pulse shape over time even after passing through the first optical delay line 142. Since the plurality of optical fibers 142$a$ and 142$b$ to 142$k$ always have the same space-time distribution regardless of the paths through which a photon is transmitted, a quantum-mechanically pure state can be maintained.

Here, a chromatic dispersion parameter D may be generally defined as a group time delay of a pulse per unit wavelength change and per unit propagation length. A unit of the chromatic dispersion parameter D may be ps/(nm·km)

When it is assumed that a wavelength bandwidth of a photon is Δλ [nm], a chromatic dispersion of each optical fiber is D, a length is L [km], and all values of D·Δλ·L of the optical fibers, which form one first optical delay line 142, are added, a change in a pulse width of a photon due to a chromatic dispersion may be adjusted to be less than a coherence time of a photon (see Expression 1)

$$D_1 \times L_1 \Delta\lambda + D_2 \times L_2 \times \Delta\lambda + \ldots + D_k \times L_k \times \Delta\lambda < \tau_l \quad \text{[Expression 1]}$$

A condition may be satisfied in which a change in the pulse width of the photon due to the chromatic dispersion is less than the coherence time of the photon. The photon generating apparatus of the embodiment can improve quantum mechanical purity of a photon.

The first optical delay line 142 may be manufactured such that the time during which a photon passes through the first optical delay line 142 is delayed for an integral multiple of the period T of the pump light source 110.

Second optical delay lines 143 may connect a plurality of optical switches 141. A plurality of second optical delay lines 143 may be provided. In addition, the second optical delay lines 143 may have different lengths or chromatic dispersions. The second optical delay lines 143 may also be applied similarly to the above-described first optical delay lines 142. Accordingly, chromatic dispersions of the second optical delay lines 143 may be removed. Hereinafter, this will be described in detail with reference to FIG. 4.

The processor 150 may output driving signals for controlling the optical switch 141 so that a delay occurs at the optical path of the buffer 140 using a time at which the detector 130 detects a photon.

The processor 150 may include a field-programmable gate array (FPGA) and a voltage amplifier. However, the embodiment is not limited thereto, and the processor 150 may include at least one among application specific integrated circuits (ASICs), digital signal processors (DSPs), digital signal processing devices (DSPDs), programmable logic devices (PLDs), FPGAs, processors, controllers, microcontrollers, microprocessors, and electric units for other functions.

The processor 150 may be connected to the detector 130. An optical path configured to compensate for a value difference between a time at which the detector 130 detects a photon and a preset time may be formed between the optical switches 141-1 to 141-$n$ so that the processor 150 may output a photon, which is a photon except for the photon detected by the detector 130, of a pair of photons from the buffer 140 at the preset time.

For example, the processor 150 may control the plurality of optical switches 141 so that an optical delay corresponding to a delay time (DT) which is a difference between a pulse C having a photon detected by the detector 130 and the number of pulses N per predetermined required time P may occur at the buffer 140. Since the optical path is controlled to be an integral multiple of the pulse period by the buffer 140, the photon generating apparatus of the embodiment can generate a photon at a required time P with a very high probability.

Figure 3:
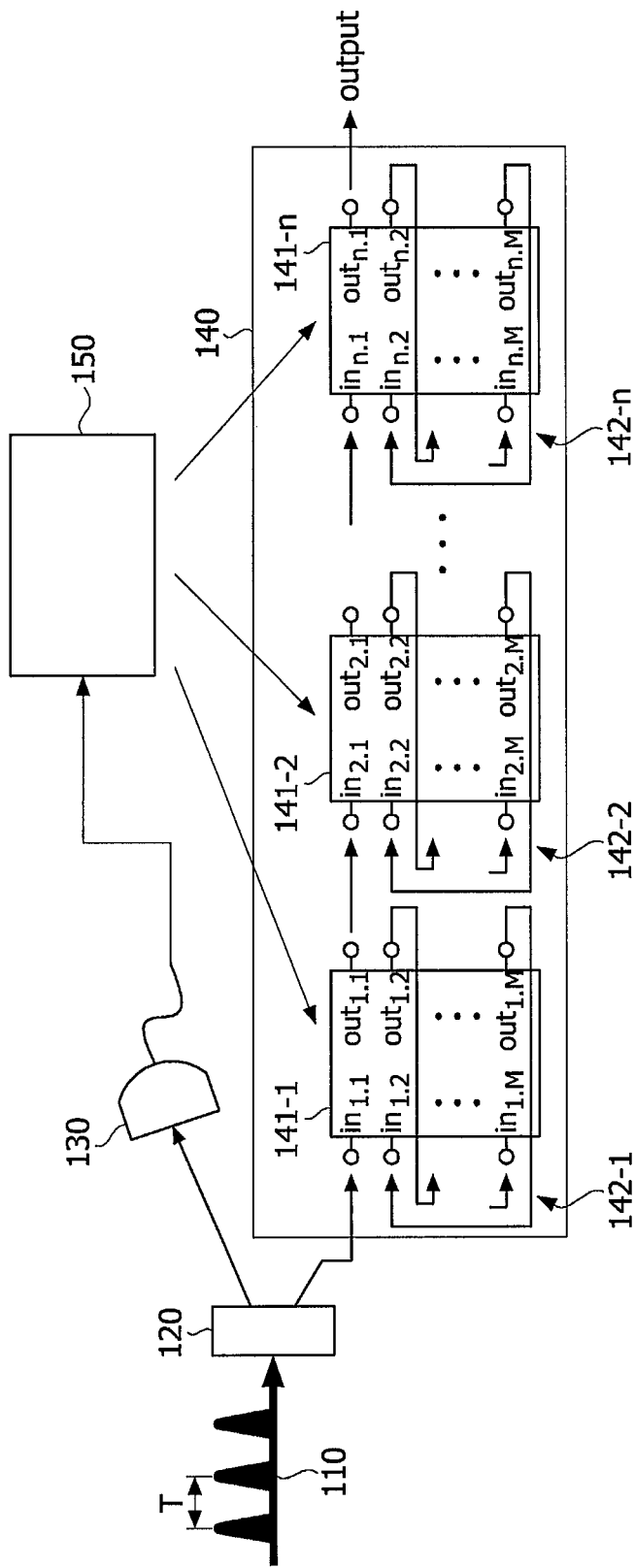
FIG. 3 is a block diagram illustrating a photon generating apparatus according to a second embodiment of the present invention.

FIG. 3 is a block diagram illustrating a photon generating apparatus according to a second embodiment of the present invention.

Referring to FIG. 3, a light source 110, an optical medium 120, and a detector 130 may be applied in the same way as described above.

Optical switches 141-1 to 141-$n$ may each include M inputs and M outputs. For example, a photon may be input to one input $in_{1.1}$ among the inputs of the first optical switch 141-1 and the photon may be output through one output $out_{1.1}$ among the outputs thereof. In addition, the remaining M−1 inputs and M−1 outputs may be connected by M−1 optical delay lines 142-1. At this time, the (M−1) optical delay lines 142-1 may delay a time during which a photon is transmitted for integral multiples of a pulse period, respectively.

A processor 150 may control an optical delay so that a photon can be generated at a required time by adjusting internal connections between a plurality of inputs $in_{1.1}$ to $in_{n.m}$ and a plurality of outputs $out_{1.1}$ to $out_{n.m}$ in the optical switches 141-1 to 141-$n$.

Accordingly, connections between the plurality of inputs $in_{1.1}$ to $in_{n.m}$ and the plurality of outputs $out_{1.1}$ to $out_{n.m}$ in the optical switches 141-1 to 141-$n$ may be determined by the processor 150 configured to generate driving signals of the optical switches 141-1 to 141-$n$ on the basis of an output of the detector 130.

The optical delay lines 142-1 to 142-1 each disposed between at least one among the plurality of inputs $in_{1.1}$ to $in_{n.m}$ and at least one among the plurality of outputs $out_{1.1}$ to $out_{n.m}$ may include at least one among a standard telecom fiber, a DCF, and a DSF. In addition, as described above, when it is assumed that a wavelength width of a photon is $\Delta\lambda$ [nm], a chromatic dispersion of each optical fiber is D [ps/(nm·km)], a length is L [km], and all values of $D\cdot\Delta\lambda\cdot L$ of the optical fibers, which form one optical delay line, are added, a change in a pulse width of a photon due to a chromatic dispersion may be less than a coherence time of a photon.

Figure 4:
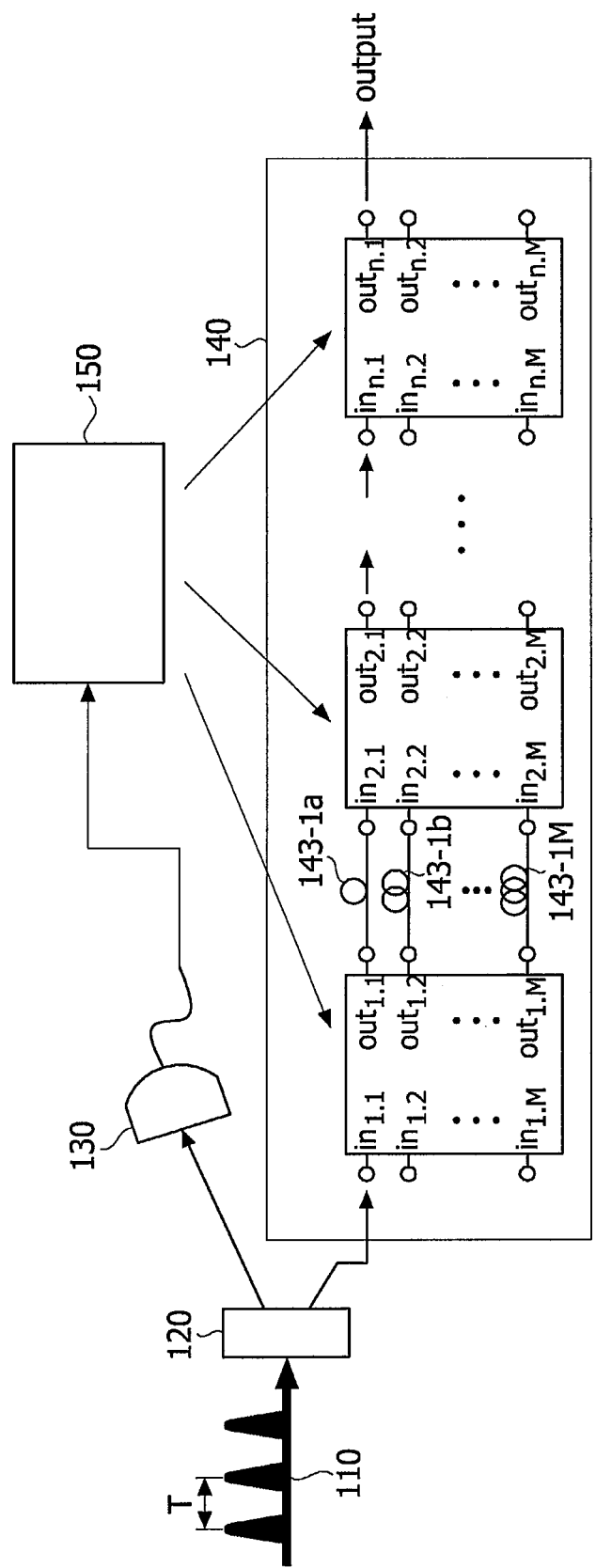
FIG. 4 is a block diagram illustrating a photon generating apparatus according to a third embodiment of the present invention.

FIG. 4 is a block diagram illustrating a photon generating apparatus according to a third embodiment of the present invention.

Referring to FIG. 4, a light source 110, an optical medium 120, and a detector 130 may be applied in the same way as described above.

For example, a photon, which is a photon except for a photon detected by the detector 130, of a pair of photons may be input to an input $in_{1.1}$ of a first optical switch 141-1. However, the embodiment is not limited thereto.

In addition, a plurality of second optical delay lines may be disposed between a plurality of optical switches. An output 1 $out_{1.1}$ to an output M $out_{1.M}$ of an $i^{th}$ optical switch 141-$i$ may be respectively connected to an input 1 $in_{(i+1).1}$ to an input M $in_{(i+1).M}$ of an $(i+1)^{th}$ optical switch 141-$(i+1)$ through second optical delay lines 143-$ia$ to 143-$iM$.

The output $out_{n.1}$ of the $n^{th}$ optical switch 141-$n$ may be a last output through which a photon is output. However, the embodiment is not limited thereto. A plurality of second optical delay lines 143-$ia$ to 143-$iM$ may be respectively disposed between the output 1 $out_{i.1}$ to the output M $out_{i.M}$ of the $i^{th}$ optical switch 141-$i$ and the input 1 $in_{1+1.1}$ to the input M $in_{1+1.M}$ of the $(i+1)^{th}$ optical switch 141-$(i+1)$.

The plurality of second optical delay lines may be manufactured such that the time during which a photon passes through the plurality of second optical delay lines is delayed for an integral multiple of a pulse period T of a light source.

In addition, the plurality of second optical delay lines may have at least ones of different lengths or chromatic dispersions. A processor 150 may generate driving signals for controlling the optical switches so that light is generated at a required time. For example, the driving signals may control internal connections between inputs and outputs of the optical switches so that a photon passes between the plurality of optical switches through selected second optical delay lines.

Similar to the above, the second optical delay lines may include a plurality of optical fibers. In addition, chromatic dispersions of the second optical delay lines may be offset similarly to FIGS. 1 and 3. That is, when it is assumed that a wavelength width of a photon is $\Delta\lambda$ [nm], a chromatic dispersion of each optical fiber is D [ps/(nm·km)], a length is L [km], and all values of $D\cdot\Delta\lambda\cdot L$ of the optical fibers, which form one optical delay line, are added, a change in a pulse width of a photon due to chromatic dispersion may be less than a coherence time of a photon.

As described above, a photon generating apparatus can be formed with a single-photon light source according to the embodiment.

In addition, a photon generating apparatus having a high probability of generating one photon at a required time can be provided.

In addition, a photon generating apparatus in which quantum mechanical purity of a photon is improved by dispersion compensation can be provided.

In addition, a photon generating apparatus having high possibilities of practical use can be provided.

Various useful advantages and effects of the present invention are not limited to the above-described descriptions, and could be easily understood while the specific embodiments of the present invention are described.

While the present invention has been described above with reference to the embodiments, it should be understood by those skilled in the art that various modifications and alterations may be made without departing from the spirit and scope of the present invention described in the appended claims.

What is claimed is:

1. A photon generating apparatus comprising:
   a light source configured to emit light;
   an optical medium configured to generate a pair of photons from the light;
   a detector configured to detect one photon from the pair of photons and output a detection time of the photon;
   a buffer including an optical line and an optical switch disposed on an optical path of the photon, which is one photon except for the photon detected by the detector, of the pair of photons; and a processor configured to output a driving signal which controls the optical switch so that a delay occurs at the optical path using the detection time of the photon detected by the detector;

wherein the optical switch includes a plurality of inputs and a plurality of outputs which are internally connected to the plurality of inputs;

wherein the optical line includes a first optical delay line disposed between at least one among the plurality of inputs and at least one among the plurality of outputs, wherein a chromatic dispersion of the first optical delay line is removed.

2. The photon generating apparatus of claim 1, wherein:
the light is emitted at a predetermined period; and
the first optical delay line is formed such that the photon, which is one photon except for the photon detected by the detector, of the pair of photons is delayed for an integral multiple of the period.

3. The photon generating apparatus of claim 2, wherein the first optical delay line includes a plurality of optical fibers.

4. The photon generating apparatus of claim 3, wherein the plurality of optical fibers have different lengths or chromatic dispersions.

5. The photon generating apparatus of claim 1, wherein the driving signal forms an optical path configured to compensate for a value difference between the detection time of the photon detected by the detector and a preset time so that the photon, which is one photon except for the photon detected by the detector, of the pair of photons is output at the preset time.

6. The photon generating apparatus of claim 1, wherein the optical medium performs one of spontaneous parametric down conversion and spontaneous four wave mixing.

7. The photon generating apparatus of claim 1, wherein:
a plurality of optical switches each identical to the optical switch are included; and
wherein the optical line includes a second optical delay line disposed between the plurality of optical switches,
wherein a chromatic dispersion of the second optical delay line is removed.

8. The photon generating apparatus of claim 7,
wherein the second optical delay line is disposed between one output and one input of one of the plurality of the optical switches.

* * * * *